Dec. 24, 1957 B. I. ULINSKI 2,817,420

EMERGENCY AND SERVICE BRAKE CONTROL

Filed Sept. 17, 1954 4 Sheets-Sheet 1

INVENTOR.
B. I. Ulinski

BY

A. H. Golden

ATTORNEY

EMERGENCY AND SERVICE BRAKE CONTROL

Filed Sept. 17, 1954 4 Sheets-Sheet 2

INVENTOR.
B. I. Ulinski
BY
A. H. Golden
ATTORNEY

Dec. 24, 1957 B. I. ULINSKI 2,817,420
EMERGENCY AND SERVICE BRAKE CONTROL
Filed Sept. 17, 1954 4 Sheets-Sheet 3
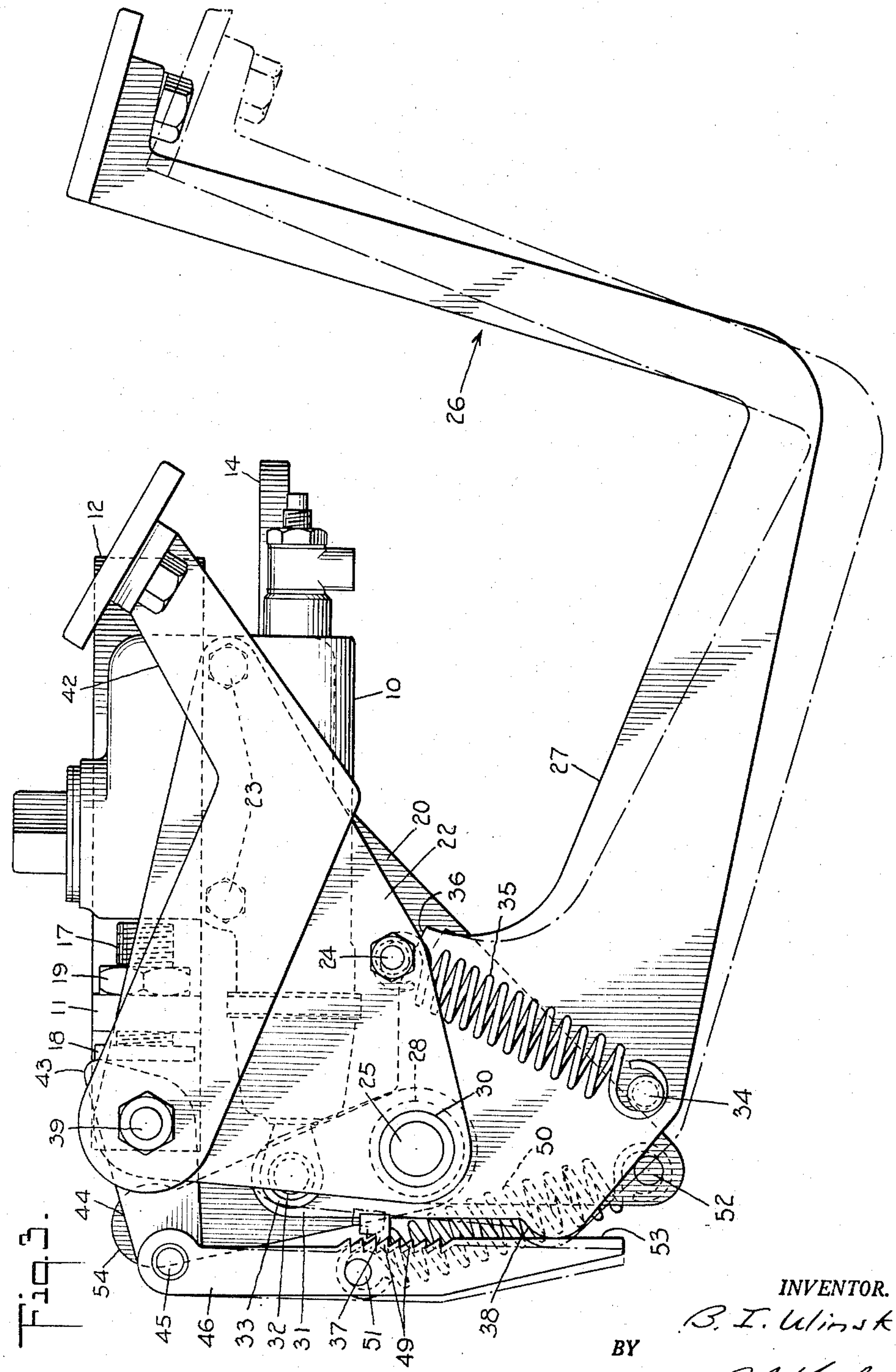
INVENTOR.
B. I. Ulinski
BY
A. A. Golden
ATTORNEY Dec. 24, 1957 B. I. ULINSKI 2,817,420
EMERGENCY AND SERVICE BRAKE CONTROL
Filed Sept. 17, 1954 4 Sheets-Sheet 4
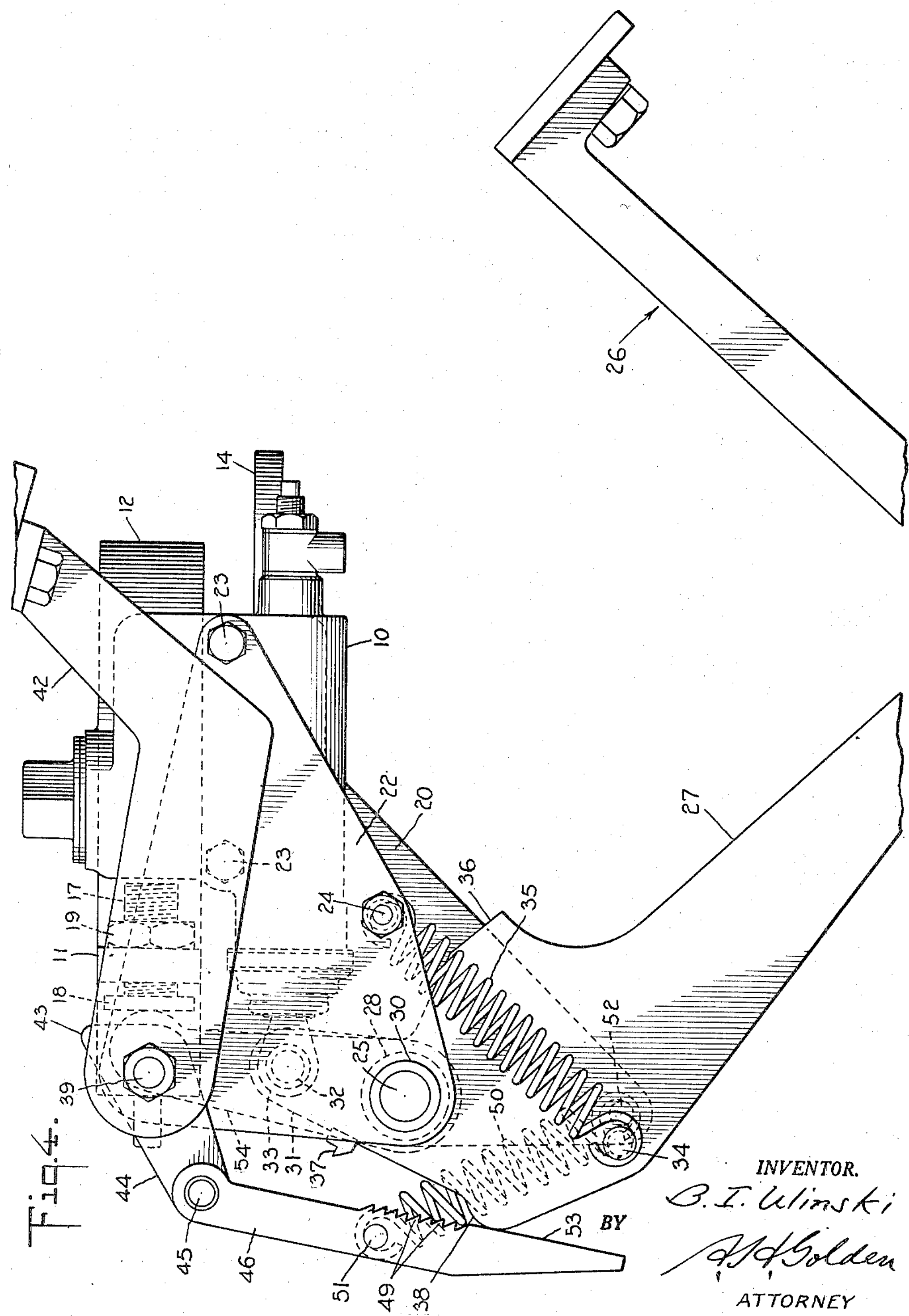

United States Patent Office 2,817,420 Patented Dec. 24, 1957

2,817,420

EMERGENCY AND SERVICE BRAKE CONTROL

Bronislaus I. Ulinski, Chicago, Ill., assignor to The Yale & Towne Manufacturing Company, Stamford, Conn., a corporation of Connecticut Application September 17, 1954, Serial No. 456,763

8 Claims. (Cl. 188—106)

This invention relates to the operation and control of an emergency or parking brake, as well as the service brake of an industrial truck.

Those skilled in the art will appreciate that industrial trucks receive very hard service and that the braking mechanism must not only be rugged and effective, but must be easily operated and easily controlled. My invention contributes means whereby the emergency or parking brake is controlled very effectively and with great ease, while being operated by a treadle or manually operated means, as well as by the treadle that operates the service brake.

As one feature of my invention, I utilize a parking or emergency brake that is mechanical in construction, using preferably a brake drum and brake shoe pressed against the drum, and the shape of the shoe and the shape of the drum may of course be of any particular class that is desired.

As a feature of my invention, I utilize means for holding the brake applied, with these means being releasable by operation of the service brake. As a further feature of my invention, I utilize a detent mechanism in the form of a pawl and ratchet, for holding the parking or emergency brake applied, and with one element of the pawl and ratchet mechanism, preferably the pawl, integral with the treadle that operates the service brake, so that the mere movement of the service brake moves the pawl relatively to the ratchet. It is a feature of the invention that a part of the treadle linearly displaced from the pawl moves the ratchet part of the detent mechanism out of engagement with the pawl so as to release the parking or emergency brake.

As a further feature of my invention, the service brake treadle is adapted to apply the emergency brake through pressure against the brake shoe whenever the service brake moves beyond a predetermined position, it being understood that it will thus move whenever the service brake fails.

As a further feature of my invention, the service brake treadle is equipped with particular portions, one such portion pressing against the emergency brake shoe, one a part of the pawl and ratchet mechanism that holds the emergency or parking brake treadle in operative position, and a third portion for releasing the detent means upon operation of the service brake. As a still further feature, the three portions are integral with the brake treadle.

With the very simple arrangement thus generally described and which will be set forth below in detail, I am able to contribute a very effective brake control in an industrial truck through exceedingly simple means, all as will be appreciated by those skilled in the art.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto.

Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 3 shows the emergency or parking brake applied and illustrates the release of the parking or emergency brake detent mechanism through depression of the service brake operating treadle.

Fig. 4 shows the full release of the detent means holding the parking or emergency brake applied, and the subsequent operation of the emergency brake by the service brake treadle because of failure of the service brake.

Figure 1:
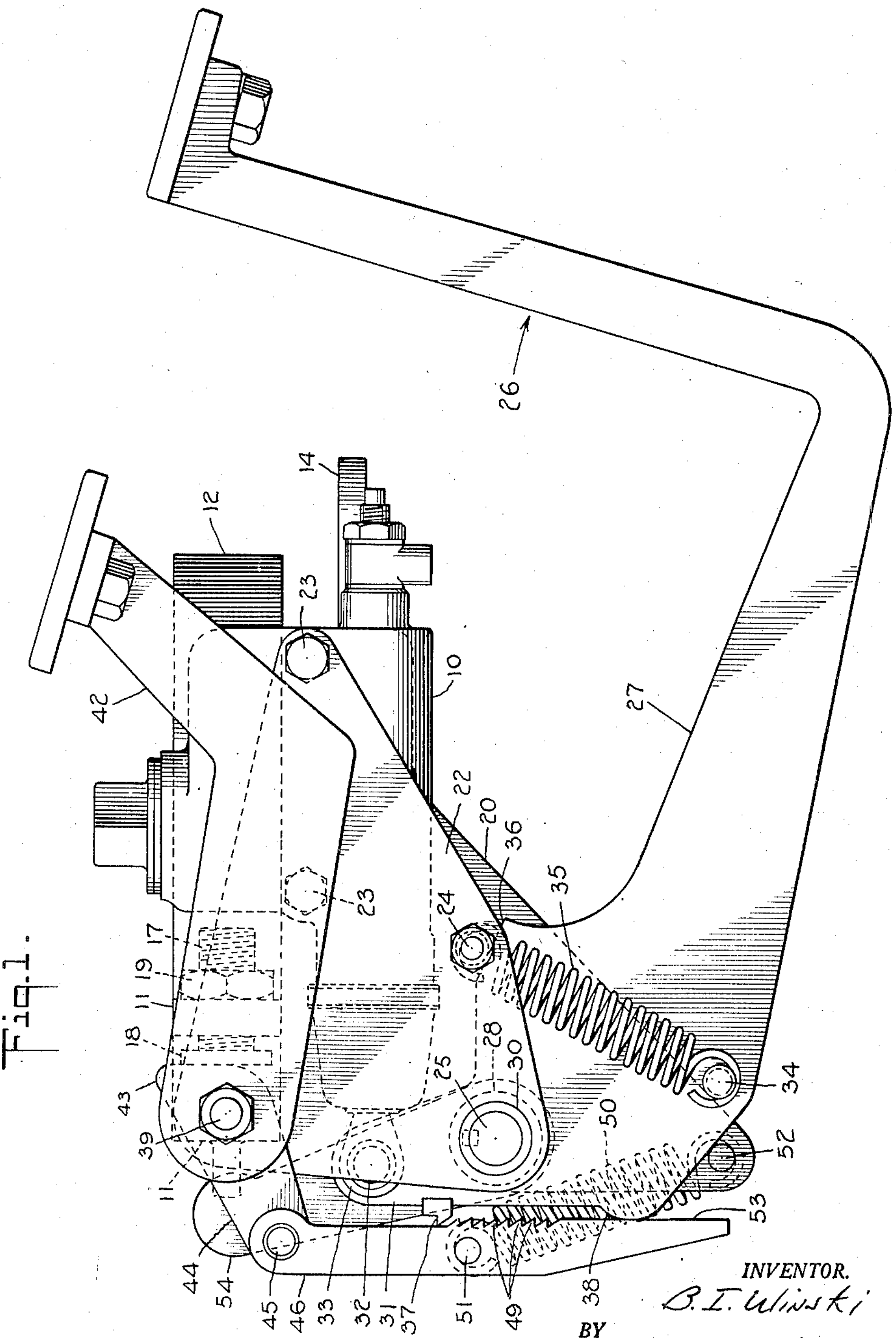
Fig. 1 is an elevation of my invention showing the service and emergency brakes in release position, the service treadle being in a position corresponding to the release position of the service brake, and the emergency or parking brake treadle being also shown in a release position.
Figure 2:
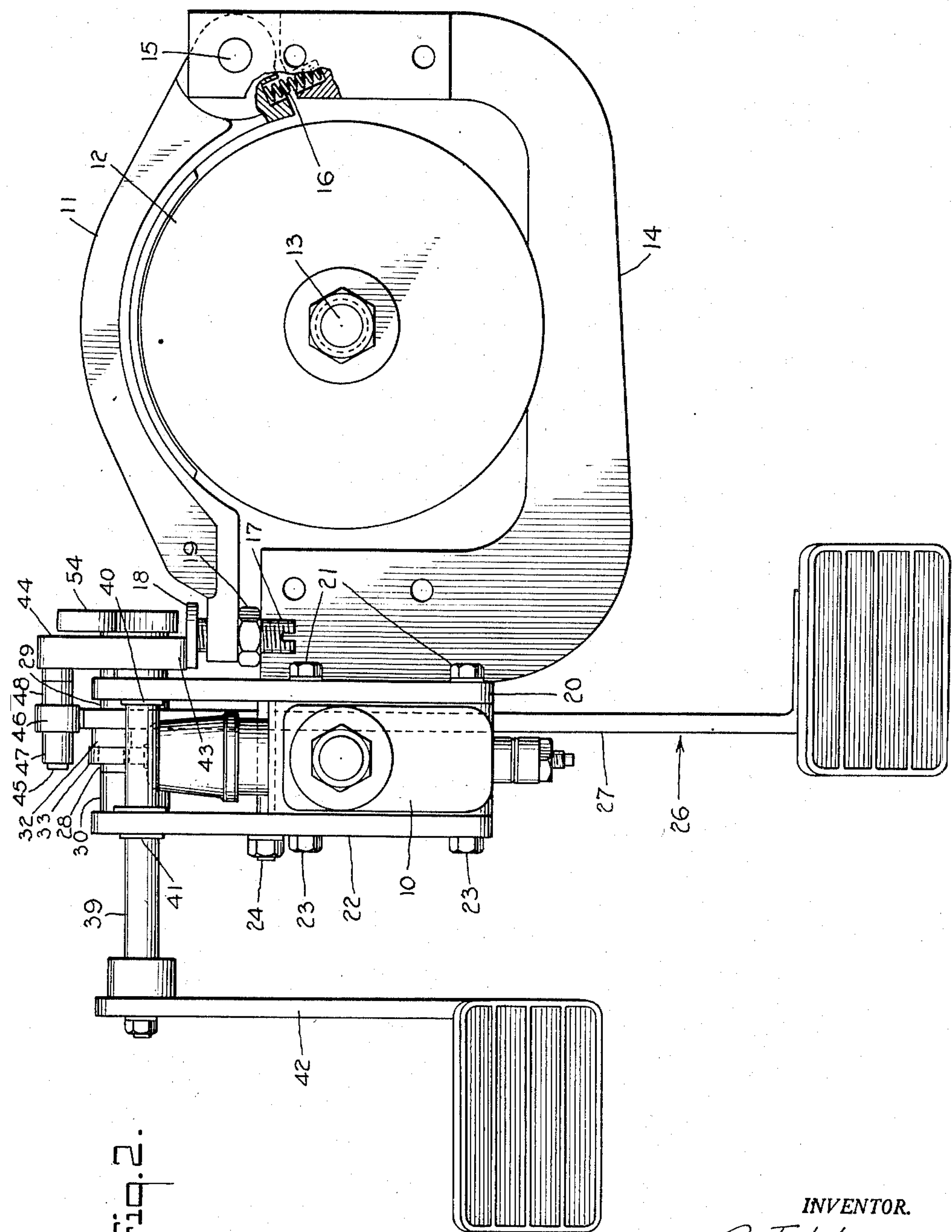
Fig. 2 is a view looking downwardly on the construction illustrated in Fig. 1.

Referring now more particularly to Figs. 1 and 2 of the drawings, I utilize in my novel brake control mechanism a hydraulic master cylinder 10 and an emergency brake shoe 11. The master cylinder 10 actuates the service brake of the truck through a suitable hydraulic system, not shown, as will be understood by those skilled in the art. In the particular construction that I have chosen to illustrate, the emergency brake shoe 11 is arranged to coact with a brake drum 12 on a vertical drive shaft 13. It is to be understood that the drum 12 is fixed on drive shaft 13 to rotate with the wheels of the truck and therefore the brake shoe 11 is capable of braking the truck.

For mounting my novel brake mechanism, I utilize a U-shaped bracket 14 extending at opposed sides of the brake drum 12 as best seen in Fig. 2, with a pivot 15 on one end of this bracket 14 mounting the emergency brake shoe 11 for movement into and out of frictional contact with brake drum 12. A coil spring 16 is engaged between the shoe 12 and bracket 14 to press the shoe toward release position on its pivot 15. The brake shoe 11 is equipped at one end with a screw stud 17 having a flat head 18 through which the brake shoe 11 is actuated. The screw stud 17 provides a means of adjustment for the brake shoe 11, and a lock nut 19 on the stud holds the stud in adjusted position. On the left hand side of the bracket 14, as viewed in Fig. 2, I weld a vertical support plate 20. I mount the service brake master cylinder 10 on the outer side of this support plate 20 through bolts 21, and I mount an outer vertical support plate 22 in turn upon the outer side of the cylinder 10 through bolts 23. Both of the support plates 20 and 22 extend forwardly from cylinder 10 in parallel relation, and are further secured relatively to one another by a transverse stud 24 below the master cylinder 10, Figs. 1 and 2.

On the lower forward portions of the support plates 20, 22, I mount a pivot shaft 25 for a treadle 26, well shown in Figs. 1 and 2. I term the treadle 26 the service brake treadle because the truck driver utilizes it to actuate the service brake master cylinder 10, but the treadle 26 nevertheless provides extremely novel control for the emergency brake, as will appear in due course. The service brake treadle 26 includes a vertical plate-like arm portion 27 that extends intermediate the support plates 20, 22, and that has a hub 28 keyed on pivot shaft 25 whereby the treadle 26 is integral with the shaft. Bushings 29, 30 on support plates 20, 22 provide bearings in which shaft 25 rotates. The plate-like portion 27 of the service brake treadle 26 extends upwardly beyond the pivot shaft 25 to form a further arm 31, Fig. 1. On the upper end of this arm 31 is a pivot pin 32, to which the piston 33 of the master cylinder 10 is attached. Thus, when the truck driver depresses the treadle 26, the piston 33 moves inwardly in the master cylinder 10 to apply the service brake. Below the pivot shaft 25 the treadle 26 has a stud 34, Fig. 1, and a coil spring 35 is engaged between this stud and the stud 24 whereby to hold the treadle 26 normally in a release position, as shown in Fig. 1. The plate-like portion 27 of the treadle preferably has a stop surface 36 that engages the stud 24 in the release position of the treadle.

Referring again to Fig. 1, I further equip the service brake treadle 26 with a pawl 37 and a cam 38 that are integral with the forward edge of the plate-like portion 27. To explain more readily the operation of the pawl 37 and cam 38, I shall first describe the emergency or parking brake, and it will be observed here merely that the pawl 37 is spaced a substantial distance upwardly from the cam 38.

Above the shaft 25, I mount a further shaft 39 on the support plates 20, 22 with bushings 40 and 41, Fig. 2, in which this shaft rotates. Shaft 39 extends somewhat to the left of the support plate 22 as viewed in Fig. 2, and has fixed upon it an emergency or parking brake pedal 42. Fixed to the opposed end of the shaft 39 and to the right of support plate 20, is a cam 43. This cam 43 is aligned with a part of the head 18 on the threaded stud 17 whereby to actuate the emergency brake shoe 11 when the pedal 42 is depressed. The cam 43 has an arm portion 44 extending forwardly in an opposed direction, and upon the end of this arm portion 44 is a pivot pin 45. I mount a ratchet 46 on pivot pin 45, this ratchet 46 extending downwardly from the pin 45 in a position forwardly of the pawl 37 and cam 38, as will be clearly seen in Fig. 1. Spacers 47, 48, Fig. 2, hold the ratchet 46 in aligned relation to the pawl 37 and cam 38.

Upon the inner side of the ratchet 46 are a series of teeth 49, Fig. 1, that are adapted to coact with the pawl 37 on the forward edge of the service brake treadle 26. The ratchet teeth 49 are so arranged, however, as to be positioned below pawl 37 and therefore out of engagement with the pawl when the emergency brake pedal 42 is in release position, as shown in Fig. 1. When pedal 42 is depressed to apply the emergency brake, the ratchet 46 moves upwardly, and it will be observed that the ratchet teeth 49 will then engage the pawl 37, as shown in solid lines in Fig. 3. In order that this engagement be positive, I prefer to utilize a coil spring 50 that is engaged with a stud 51 on ratchet 46, and that extends downwardly and rearwardly to a stud 52 on support plate 20. Thus, once the emergency brake is applied, the service brake treadle 26 automatically holds the emergency brake applied through the engagement between pawl 37 and a particular ratchet tooth 49.

In order to effect release of the emergency or parking brake, I utilize the cam 38 on the service brake treadle 26, and to coact with this cam I form on the lower portion of the ratchet 46 a surface 53. It will be remembered that the cam 38 is a substantial distance below the pawl 37, and it will be understood therefore that cam 38 will have a certain horizontal movement relatively to pawl 37 when the service brake treadle 26 rotates on its shaft 25. Thus, when treadle 26 is depressed, as shown in dot-and-dash lines in Fig. 3, the cam 38 moves toward the left relatively to pawl 37. Through coaction with the surface 53, the cam 38 then moves ratchet 46 on its pivot 45 to the left, as viewed in Fig. 3, and the pawl 37 and ratchet teeth 49 are disengaged from each other. Of course, the ratchet 46 is then free to move downwardly, with the emergency brake pedal 42 moving simultaneously to release position, as shown in Fig. 1. Actually, because the coil spring 50 is arranged to pull the ratchet 46 downwardly as well as inwardly, I can utilize this spring to move pedal 42 to release position.

Through the construction that I have thus far described, the emergency brake is held automatically in applied position once it is applied, and in addition, I provide automatic release of the emergency brake when the truck driver depresses the service brake treadle.

I shall now describe the means through which I make the service brake treadle effective also to apply the emergency brake. Referring to Figs. 1 and 2, it will be noted that the service brake shaft 25 is equipped with an arm 54 that is juxtaposed to the emergency brake cam 43, and in opposed relation to a part of the head 18 on the emergency brake stud 17. As best seen in Fig. 1, the upper end of arm 54 is aligned with the head 18. This arm 54 is fixed relatively to the shaft 25 and thereby is actually an integral part of the service brake treadle 26. The angular position of the arm 54 on the shaft 25 is such that it does not engage the head 18 during normal operation of the service brake, as I have shown in Fig. 3. If, however, piston 33 of the service brake cylinder 10 moves past the position in which it would normally apply the service brake, the arm 54 actuates the emergency brake shoe 11 through contact with the head 18 on the stud 17, as shown in Fig. 4. Through this construction, the service brake treadle 26 will be effective to brake the truck, if for some reason the service brake does not act when the treadle is depressed to a predetermined point.

I obtain this novel action, moreover, while utilizing the service brake treadle for additional functions. Thus, the service brake treadle controls the holding and the release of the emergency brake through extremely simple means that are preferably integral with the emergency brake treadle. I believe that the construction and operation of my extremely novel brake control will now be fully understood, and that those persons skilled in the art will appreciate the very considerable advantages of my invention.

I now claim:

1. In a combination of the class described, a hydraulic service brake master cylinder, a treadle for actuating said master cylinder to apply the service brake, an emergency brake, manually actuated means for applying said emergency brake, detent means for holding said emergency brake in applied position once it has been applied, means whereby the movement of said treadle to apply the service brake releases said emergency brake from said detent means, and means whereby said treadle applies the emergency brake in the event the treadle moves beyond that position in which it applies the service brake, as in the event of failure of said service brake.

2. In a combination of the class described, a hydraulic service brake master cylinder, a treadle for actuating said master cylinder to apply the service brake, an emergency brake, manually actuated means for applying said emergency brake, detent means for holding said emergency brake in applied position once it has been applied by said manually actuated means, and means whereby the movement of said treadle to apply the service brake releases said emergency brake from said detent means.

3. In a combination of the class described, a hydraulic service brake, a treadle for applying said service brake, an emergency brake, a spring for holding the emergency brake in a release position, a member moving with the service brake treadle for applying pressure to the emergency brake in opposed relation to the spring pressure, and said member formed with a surface moving against the emergency brake in the event the treadle moves beyond that position in which it applies the service brake whereby to apply and release the emergency brake through treadle movement in the event of failure of said service brake.

4. In a combination of the class described, a hydraulic service brake master cylinder, a treadle for actuating said master cylinder to apply the service brake, an emergency mechanical brake including a brake shoe, manually actuated means for pressing said shoe to apply said emergency brake, detent means for holding said manual means in applied position once the emergency brake has been applied, a part of said treadle releasing said emergency brake from said detent means as said treadle is moved to apply the service brake, and means whereby said treadle presses the emergency brake shoe to braking position in the event the treadle moves beyond that position in which it applies the service brake, as in the event of failure of said service brake.

5. In a combination of the class described, a hydraulic service brake master cylnider, a treadle for actuating said master cylinder to apply the service brake, an emergency mechanical brake shoe, means for applying said emergency brake shoe, detent means on said treadle for holding said emergency brake shoe in applied position once it has been applied, means whereby the movement of said treadle to apply the service brake releases said emergency brake shoe from said detent means, and means whereby said treadle applies the emergency brake shoe in the event the treadle moves beyond that position in which it applies the service brake, as in the event of failure of said service brake.

6. In a combination of the class described, a hydraulic service brake master cylinder, a treadle for actuating said master cylinder to apply the service brake, an emergency brake, manually actuated means for applying said emergency brake, an integral detent portion on said treadle, a part with which said detent portion coacts for holding said emergency brake in applied position once it has been applied, and a further integral portion on said treadle moving the said part out of coacting relation to the detent portion when the treadle moves to apply the service brake whereby to release said emergency brake.

7. In a combination of the class described, a service brake, a treadle for applying the service brake, an emergency brake, manually actuated means for applying the emergency brake, an integral detent portion on said treadle, a part on the emergency brake coacting with said detent portion once the emergency brake has been applied whereby to hold the emergency brake in applied position, an integral portion on said treadle for moving the said part out of coacting relation to the detent portion whereby to release the emergency brake when the treadle moves to apply the service brake, and a further integral portion on said treadle whereby the treadle applies the emergency brake when the treadle moves beyond a position in which it applies the service brake.

8. In a combination of the class described, a hydraulic brake master cylnider, a treadle for actuating said master cylinder in a brake applying direction, additional brake applying means, detent means for holding said additional brake applying means in brake applying position once they move to that position, means whereby the movement of said treadle to actuate the brake master cylinder releases said additional brake applying means from said detent means, and means whereby said treadle actuates the additional means in the event the treadle moves beyond that position in which it normally actuates the master cylinder, as in the event of failure of said cylinder.

References Cited in the file of this patent

UNITED STATES PATENTS

| | | |
|---|---|---|
| 1,222,839 | Wright | Apr. 17, 1917 |
| 1,563,588 | Richard | Dec. 1, 1925 |
| 1,995,880 | Clark | Mar. 26, 1935 |
| 2,156,290 | Hubbell | May 2, 1939 |
| 2,189,192 | Brock et al. | Feb. 6, 1940 |
| 2,219,518 | Engle et al. | Oct. 29, 1940 |
| 2,720,293 | Brinkmeyer | Oct. 11, 1955 |

FOREIGN PATENTS

| | | |
|---|---|---|
| 426,630 | Great Britain | Apr. 1, 1935 |